United States Patent
Ishii et al.

(10) Patent No.: US 7,564,924 B2
(45) Date of Patent: Jul. 21, 2009

(54) RECEPTION DEVICE, DEMODULATOR, AND COMMUNICATION METHOD

(75) Inventors: Hiroyuki Ishii, Yokosuka (JP); Masafumi Usuda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 503 days.

(21) Appl. No.: 10/703,504

(22) Filed: Nov. 10, 2003

(65) Prior Publication Data

US 2004/0096015 A1 May 20, 2004

(30) Foreign Application Priority Data

Nov. 12, 2002 (JP) .............................. 2002-328787

(51) Int. Cl.
*H03K 9/00* (2006.01)
(52) U.S. Cl. ...................... 375/316; 375/341
(58) Field of Classification Search ................. 375/261, 375/264, 286, 287, 316, 320
See application file for complete search history.

(56) References Cited

U.S. PATENT DOCUMENTS

| | | | |
|---|---|---|---|
| 5,442,655 A | 8/1995 | Dedic et al. | |
| 6,201,841 B1 * | 3/2001 | Iwamatsu et al. | 375/346 |
| 6,353,642 B1 * | 3/2002 | Asahara et al. | 375/344 |
| 6,658,261 B1 * | 12/2003 | Winters et al. | 455/504 |
| 6,760,360 B1 * | 7/2004 | Kawai | 375/130 |
| 6,931,239 B2 * | 8/2005 | Hongo et al. | 455/103 |
| 6,961,393 B1 * | 11/2005 | Cupo et al. | 375/343 |
| 6,987,814 B2 * | 1/2006 | Iwamatsu et al. | 375/298 |
| 7,027,537 B1 * | 4/2006 | Cheong et al. | 375/348 |
| 2006/0206290 A1 * | 9/2006 | Shin et al. | 702/189 |

FOREIGN PATENT DOCUMENTS

| | | |
|---|---|---|
| CN | 1372728 | 10/2002 |
| CN | 1377537 | 10/2002 |
| EP | 1 191 713 | 3/2002 |
| EP | 1 209 870 | 5/2002 |
| JP | 6-244888 | 9/1994 |
| JP | 8-163198 | 6/1996 |
| JP | 11-186940 | 7/1999 |
| JP | 2002-33780 | 1/2002 |
| JP | 2002-217862 | 8/2002 |
| WO | WO 00/51254 | 8/2000 |

OTHER PUBLICATIONS

Sophia Antipolic, France, "Pilot Power Ratio Signaling (Corrected)", Motorola, TSG-RAN-WG1 HSDPA Ad-Hoc. TSGR1 (01) 1087,, Nov. 5-7, 2001, pp. 1-9.

* cited by examiner

*Primary Examiner*—Chieh M. Fan
*Assistant Examiner*—Freshteh N. Aghdam
(74) *Attorney, Agent, or Firm*—Oblon, Spivak, McClelland, Maier & Neustadt, P.C.

(57) ABSTRACT

A reception device comprises an averaging unit configured to calculate at least one of an average value concerning in-phase components and quadrature phase components for a plurality of received data symbols, and an average value of reception power values for the plurality of received data symbols; and an amplitude estimator configured to estimate amplitudes of the plurality of data symbols based on the average value calculated by the averaging unit.

7 Claims, 6 Drawing Sheets

FIG.5A DATA SYMBOL SERIES

RECEPTION DEVICE, DEMODULATOR, AND COMMUNICATION METHOD

CROSS REFERENCE TO RELATED APPLICATIONS

This application is based upon and claims the benefit of priority from the prior Japanese Patent Application No. P2002-328787, filed on Nov. 12, 2002; the entire contents of which are incorporated herein by reference.

BACKGROUND OF THE INVENTION

1. Field of the Invention

The present invention relates to a reception device, a demodulator, and a communication method.

2. Description of the Related Art

In recent years, a multi-level modulation system has been considered as one means of increasing transmission capacity in mobile communication. In other words, in mobile communication, using a multi-level quadrature amplitude modulation (QAM), such as 16 QAM and 64 QAM processing many bits in a single symbol has been considered, instead of using a modulation such as quadrature phase shift keying (QPSK) for a conventional personal digital cellular telecommunications system (PDC) and a personal handy-phone system (PHS).

With QPSK, demodulation should be performed considering only phase variation occurring during transfer of a signal through a propagation path; however, with a multi-level quadrature amplitude modulation such as 16 QAM or 64 QAM, demodulation must be performed considering amplitude variation as well as phase variation. But, in mobile communication, sharp amplitude variation generally occurs, due to restriction and control of transmission power and fading. As a result, amplitude variation must be accurately estimated in order to use multi-level quadrature amplitude modulation for mobile communication.

Conventionally, amplitudes have been estimated using a pilot symbol when performing multi-level quadrature amplitude modulation (e.g., Japanese Patent Application Laid-Open No. 2002-217862). More specifically, a transmission side notifies a reception side of transmission power ratios of a pilot symbol to data symbols in order to perform channel estimation. The reception side then estimates the amplitudes of the data symbols based on the amplitude of the received pilot symbol and the transmission power ratios of the pilot symbol to the data symbols. The reception side also performs a hard decision for the received data symbols, based on the estimated data symbol amplitudes. Alternatively, other than notifying of transmission power ratios by the transmission side, there has been a method of estimating the amplitude, whereby the reception side estimates transmission power ratios and estimates the amplitude using the estimated transmission power ratios. In addition, there has been a method of estimating the amplitude, which is using the received power of a data symbols and the noise dispersion estimated from the pilot symbol (e.g., 'PILOT POWER RATIO SIGNALING (Corrected)', Motorola, TSG-RAN-WG1 HSDPA Ad-Hoc. TSGR1 (01) 1087, Sophia Antipolis, France, Nov. 5 to 7, 2001).

However, the conventional amplitude estimation method needs a transmission side to notify a reception side of the transmission power ratios of a pilot symbol to data symbols. The reception side must receive the notification of the transmission power ratios and then estimate amplitudes using the notified transmission power ratios. Furthermore, the notification may contain an error. Moreover, in the case where the reception side estimates transmission power ratios, to begin with it must estimate transmission power ratios and then estimate amplitudes using the estimated ratios. Also, in order to estimate amplitudes using the received power of data symbols and the noise dispersion estimated from a pilot symbol, to begin with estimation of noise dispersion and then estimation of amplitudes using the estimated noise variance is required. Therefore, the conventional amplitude estimation method causes a control delay, an increase of control load on both a transmission and a reception side, and difficulty in accurate estimation.

BRIEF SUMMARY OF THE INVENTION

An object of the present invention is to provide a reception device, a demodulator, and a communication method, which can easily estimate amplitudes of data symbols and reduce a control load and a control delay.

A reception device of the present invention comprises an averaging unit configured to calculate at least one of an average value concerning in-phase components and quadrature phase components for a plurality of received data symbols, and an average value of reception power values for the plurality of received data symbols; and an amplitude estimator configured to estimate amplitudes of the plurality of data symbols based on the average value calculated by the averaging unit.

According to the reception device, the averaging unit calculates at least one of an average value concerning in-phase components and quadrature phase components for a plurality of received data symbols, and an average value of the reception power values for the plurality of received data symbols. The amplitude estimator estimates amplitudes of the plurality of data symbols based on the average value. Those average values for the data symbols are equivalent to amplitudes of the data symbols.

As a result, the reception device can directly and easily estimate amplitudes using received symbols. Accordingly, the reception device can easily estimate amplitudes without using a complex method, such as receiving notification of transmission power ratios to estimate amplitudes using the transmission power ratios, or estimating transmission power ratios and then estimating amplitudes using the estimated ratios. As a result, the reception device can reduce a control load and a control delay.

A demodulator according to the present invention comprises an averaging unit configured to calculate an average value for a plurality of received data symbols; and an amplitude estimator configured to estimate amplitudes of the plurality of data symbols based on the average value calculated by the averaging unit.

A communication method according to the present invention comprises calculating at least one of an average value concerning in-phase components and quadrature phase components for a plurality of received data symbols, and an average value of reception power values for the plurality of received data symbols; and estimating amplitudes of the plurality of data symbols based on a calculated average value.

Note that average values for the plurality of data symbols, such as an average value concerning in-phase components and quadrature phase components for the data symbols, and an average value of reception power values for the data symbols, include not only an average value for all received data symbols but also an average value for a part selected from the received data symbols and an average value for data symbols except for data symbols with great differences from other data symbols.

DETAILED DESCRIPTION OF THE INVENTION

First Embodiment (Reception Device)

Figure 1:
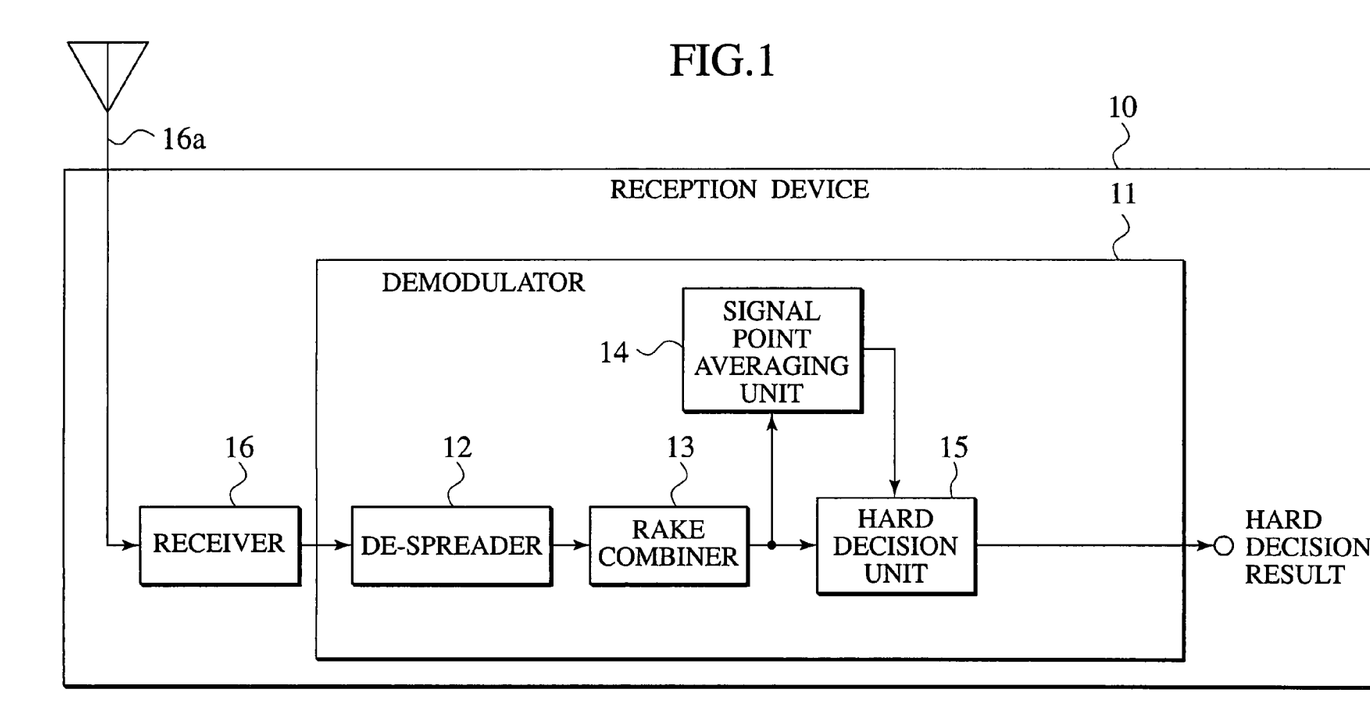
FIG. 1 is a block diagram illustrating a configuration of a reception device according to a first embodiment of the present invention.

As shown in FIG. 1, a reception device 10 comprises a demodulator 11, a receiver 16, and an antenna 16a. The receiver 16 receives a signal via the antenna 16a. The receiver 16 receives a signal such as a data chip, which is a high-speed data series spread over a wide band. The receiver 16 receives a signal, which has been modulated by a multi-level quadrature amplitude modulation such as 16 QAM or 64 QAM in a transmission device. The receiver 16 inputs the received data chip to the demodulator 11.

The demodulator 11 demodulates the received signal. The demodulator 11 comprises a de-spreader 12, a RAKE combiner 13, a signal point averaging unit 14, and a hard decision unit 15. Note that FIG. 1 shows a section included in the demodulator 11, which operates processes from inputting a signal received by the receiver 16 to performing a hard decision.

The de-spreader 12 receives the received data chip from the receiver 16. The de-spreader 12 de-spreads the received data chip at each multipath reception time. The de-spreader 12 inputs data symbols of each received multipath, which have been obtained by de-spreading the data chip to the RAKE combiner 13.

The RAKE combiner 13 receives data symbols of each received multipath from the de-spreader 12. The RAKE combiner 13 RAKE-combines data symbols of each received multipath. The RAKE combiner 13 performs a channel estimation. In other words, the RAKE combiner 13 estimates a propagation environment through which a signal received by the receiver 16 has been propagated, namely, the condition of a communication channel. The RAKE combiner 13 performs a channel estimation using a pilot symbol, for example. The RAKE combiner 13 RAKE-combines the data symbols of each received multipath into data symbols by maximum ratio combining, based on the channel estimation result. The RAKE combiner 13 inputs the generated data symbols to the signal point averaging unit 14 and the hard decision unit 15.

Note that it is not always necessary for the RAKE combiner 13 to perform a channel estimation. Alternatively, the RAKE combiner 13 may receive channel estimation result from other units.

The signal point averaging unit 14 is an averaging unit configured to calculate an average value for a plurality of received data symbols. The signal point averaging unit 14 receives the data symbol generated from the data chip, which has been received by the receiver 16, from the RAKE combiner 13. The signal point averaging unit 14 calculates an average value for the plurality of data symbols inputted from the RAKE combiner 13. The signal point averaging unit 14 inputs the calculated average value to the hard decision unit 15.

A case where the receiver 16 receives a signal modulated by 16 QAM and the signal point averaging unit 14 receives 4800 data symbols from the RAKE combiner 13 is described as an example. Note that an in-phase component (hereafter, referred to as 'I component') and a quadrature phase component (hereafter, referred to as 'Q component') of each data symbol are represented as 'Ii' and 'Qi' (i=1 through 4800), respectively, and each data symbol is represented as (Ii , Qi ). In other words, the signal point averaging unit 14 receives 4800 data symbols $(I_1, Q_1)$ through $(I_{4800}, Q_{4800})$ from the RAKE combiner 13.

The signal point averaging unit 14 calculates an average value concerning I components and Q components for a plurality of received data symbols, as an average value for the plurality of received data symbols. For example, the signal point averaging unit 14 calculates a combination of an average value for absolute values of I components for data symbols (hereafter, referred to as 'average I component absolute value') and an average value for absolute values of Q components for data symbols (hereafter, referred to as 'average Q component absolute value'), as an average value concerning I components and Q components for data symbols. In this case, the signal point averaging unit 14 calculates the average I component absolute value by averaging the absolute values of I components for data symbols, and also calculates the average Q component absolute value by averaging the absolute values of Q components for data symbols.

Figure 2:
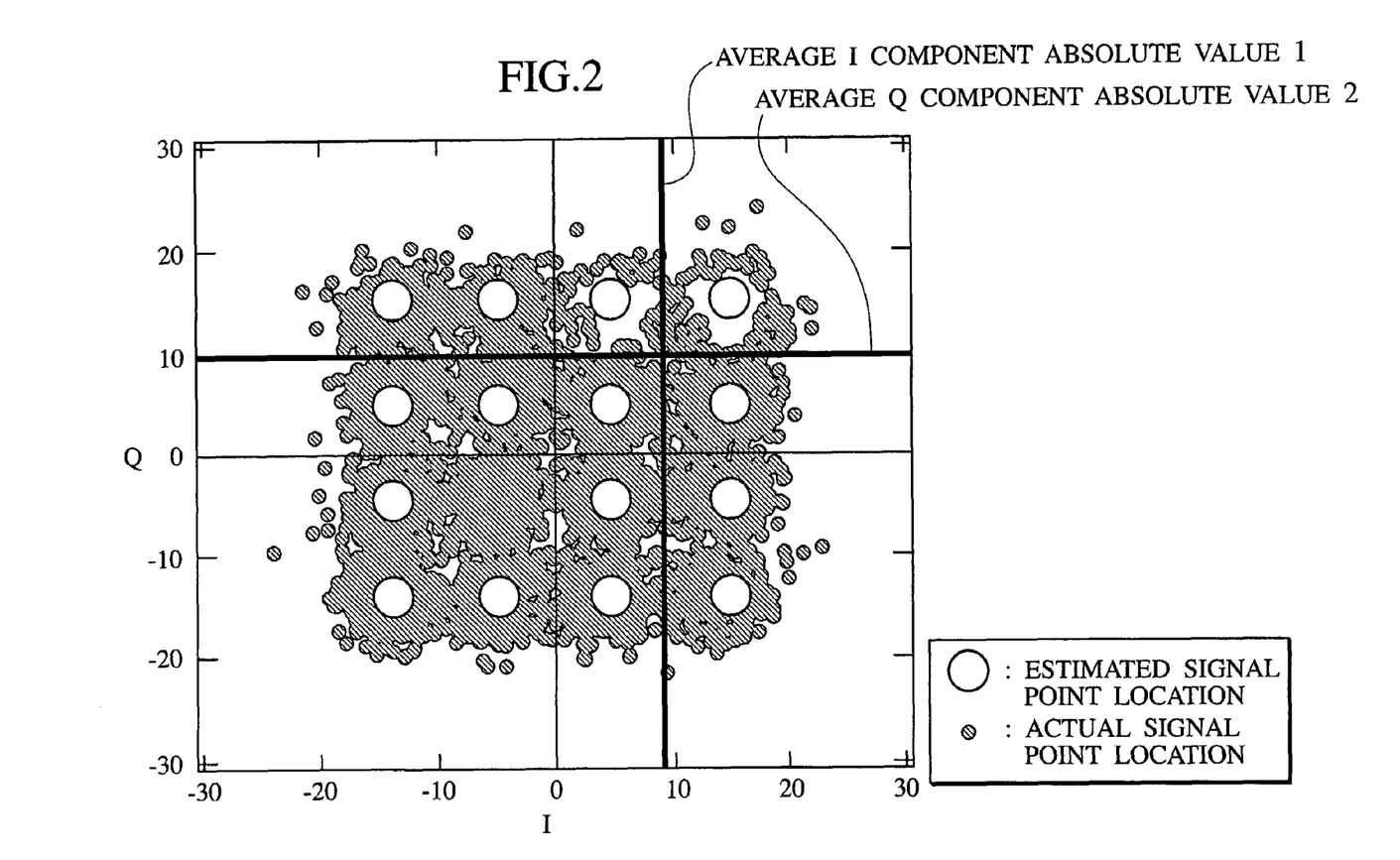
FIG. 2 is a signal constellation diagram according to the first embodiment of the present invention.

More specifically, the signal point averaging unit 14 determines an I component and a Q component of each data symbol based on the actual signal point location of the data symbol, which is indicated by a hatched circle in the signal constellation diagram of FIG. 2. As shown in the following Expression (1) and Expression (2), the signal point averaging unit 14 then calculates an average I component absolute value by averaging the absolute values of I components for 4800 data symbols and also calculates an average Q component absolute value by averaging the absolute values of Q components for 4800 data symbols. The average I component absolute value 1 calculated using Expression (1) and the average Q component absolute value 2 calculated using Expression (2) are shown in FIG. 2. Note that in FIG. 2, the vertical axis represents the Q components and the horizontal axis represents the I components. In addition, the vertical axis and the horizontal axis are both arbitrary axes.

$$\text{Average } I \text{ component absolute value} = (|I_1|+|I_2|+ \ldots +|I_{4800}|)/4800 \quad (1)$$

$$\text{Average } Q \text{ component absolute value} = (|Q_1|+|Q_2|+ \ldots +|Q_{4800}|)/4800 \quad (2)$$

Alternatively, the signal point averaging unit 14 may calculate a combination of an average value for positive measured values of I components for data symbols (hereafter, referred to as 'positive average I component measured value'), an average value for negative measured values of I components for data symbols (hereafter, referred to as 'negative average I component measured value'), an average value for positive measured values of Q components for data symbols (hereafter, referred to as 'positive average Q component measured value'), and an average value for negative measured values of Q components for data symbols (hereafter, referred to as 'negative average Q component measured value'), as an average value concerning I components and Q components for data symbols.

In this case, the signal point averaging unit 14 calculates the positive average I component measured value by averaging positive measured values of I components for data symbols, calculates the negative average I component measured value by averaging negative measured values of I components for data symbols, calculates the positive average Q component measured value by averaging positive measured values of Q components for data symbols, and calculates the negative average Q component measured value by averaging negative measured values of Q components for data symbols. The signal point averaging unit 14 then compares the absolute value of the positive average I component measured value with the absolute value of the negative average I component measured value, and also compares the absolute value of the positive average Q component measured value with the absolute value of the negative average Q component measured value, to determine whether or not there is a difference between the absolute value of the positive average value and the absolute value of the negative average value.

When the difference between the absolute value of the positive average value and the absolute value of the negative average value is lower than the predetermined value, in other words, when they are almost equal, the signal point averaging unit 14 inputs either a positive average I component measured value or a negative average I component measured value, and either a positive average Q component measured value or a negative average Q component measured value, to the hard decision unit 15, respectively. Meanwhile, when the difference between the absolute value of the positive average value and the absolute value of the negative average value is more than or equal to a predetermined value, in other words, when there is a great difference between them, the signal point averaging unit 14 inputs a positive average I component measured value and a negative average I component measured value, and a positive average Q component measured value and a negative average Q component measured value, to the hard decision unit 15, respectively.

Alternatively, the signal point averaging unit 14 may calculate an average value for absolute values of I components and Q components for data symbols (hereafter, referred to as 'average both components absolute value'). In this case, the signal point averaging unit 14 calculates the average both components absolute value by averaging the absolute values of I components and Q components for data symbols. More specifically, as shown in Expression (3), the signal point averaging unit 14 calculates an average both components absolute value by averaging total 9600 components, which are absolute values of I components for 4800 data symbols plus absolute values of Q components for 4800 data symbols.

$$\text{Average both components absolute value} = \\ (|I_1|+|I_2|+\ldots+|I_{4800}|+|Q_1|+|Q_2|+\ldots+|Q_{4800}|)/ \\ 9600 \quad (3)$$

In addition, the signal point averaging unit 14 may calculate a combination of an average value for positive measured values of I components and Q components for data symbols (hereafter, referred to as 'positive average both components measured value'), and an average value for negative measured values of I components and Q components for data symbols (hereafter, referred to as 'negative average both components measured value'), as an average value concerning I components and Q components for data symbols. In this case, the signal point averaging unit 14 calculates the positive average both components measured value by averaging positive measured values of both I and Q components for data symbols, and calculates the negative average both components measured value by averaging negative measured values of both I and Q components for data symbols.

The signal point averaging unit 14 then compares the absolute value of the positive average both components measured value with the absolute value of the negative average both components measured value, to determine whether or not there is a difference between the absolute value of the positive average values and the absolute value of the negative average values. When the difference between the absolute value of the positive average value and the absolute value of the negative average value is lower than the predetermined value, in other words, when they are almost equal, the signal point averaging unit 14 inputs either a positive average both components measured value or negative average both components measured value, to the hard decision unit 15. Meanwhile, when the difference between the absolute value of the positive average value and the absolute value of the negative average value is more than or equal to a predetermined value, in other words, when there is a great difference between them, the signal point averaging unit 14 inputs a positive average both components measured value and a negative I average both components measured value, to the hard decision unit 15.

As described above, when calculating as the average value concerning I components and Q components for data symbols, the average both components absolute value or the average both components measured value, which is calculated from the absolute value or the measured value of I components and Q components for data symbols, the signal point averaging unit 14 can increase the number of elements used to calculate the average value. As a result, the signal point averaging unit 14 can decrease noise components included in data symbols. Accordingly, when the I component absolute values are almost the same as the Q component absolute values, or the I component measured values are almost the same as the Q component measured values, the signal point averaging unit 14 can accurately estimate amplitudes of data symbols, based on the average both component absolute value or average both component measured value.

In addition, the signal point averaging unit 14 may calculate an average value of reception power values for the plurality of received data symbols (hereafter, referred to as 'average reception power value'), as an average value for the plurality of received data symbols. The signal point averaging unit 14 calculates the average reception power value, by squaring each of the I component measured values and the Q component measured values for data symbols, adding them together, and dividing the sum given by the addition, by the total number of components, that is, the total number of the I and Q components. More specifically, as shown in Expression (4), the signal point averaging unit 14 calculates an average reception power value by adding together the squares of the respective I component measured values for 4800 data symbols and the squares of the respective Q component measured values for 4800 data symbols, and dividing the sum given by the addition, by the total number of the components, that is, 9600.

$$\text{Average reception power value} = (I_1^2+Q_1^2+I_2^2+ \\ Q_2^2+\ldots+I_{4800}^2+Q_{4800}^2)/9600 \quad (4)$$

Note that average values for the plurality of data symbols, such as an average value concerning I components and Q components for the data symbols, or an average value of reception power values for the data symbols, include not only an average value for all data symbols received by the receiver 16 but also an average value for a part selected from the received data symbols and an average value for data symbols except for data symbols with great differences in I or Q components from other data symbols.

Accordingly, when calculating an average value concerning I and Q components for data symbols, the signal point averaging unit 14 need not calculate an average value using all received 4800 data symbols. The signal point averaging unit 14 may select a predetermined proportion of data symbols from the received data symbols, and then calculate an average value using the selected data symbols. For example, an average value may be calculated using 50% of the received 4800 data symbols, that is, 2400 data symbols. Alternatively, the signal point averaging unit 14 may calculate an average value using received data symbols except for data symbols having a difference in I or Q components from other data symbols being more than or equal to a predetermined value.

The hard decision unit 15 functions as an amplitude estimator configured to estimate amplitudes of the plurality of data symbols based on the average value calculated by the signal point averaging unit 14. In addition, the hard decision unit 15 performs a hard decision for the plurality of data symbols, based on the estimated amplitudes of the plurality of data symbols. The hard decision unit 15 receives a data symbol generated from a data chip received by the receiver 16 from the RAKE combiner 13. In addition, the hard decision unit 15 receives an average value for a plurality of received data symbols from the signal point averaging unit 14. The hard decision unit 15 estimates the amplitudes of data symbols inputted from the RAKE combiner 13, based on the average value for data symbols inputted from the signal point averaging unit 14.

The amplitudes of data symbols are equivalent to average values for data symbols, such as an average I component absolute value, an average Q component absolute value, an average I component measured value, an average Q component measured value, an average both components absolute value, an average both components measured value, and an average reception power value for data symbols. Therefore, the hard decision unit 15 may easily and directly estimate the amplitudes of data symbols based on those average values. Note that since the average value concerning I components and Q components for data symbols contains less noise components than the average reception power value for data symbols, it is preferable that the hard decision unit 15 estimates the amplitudes based on the average values concerning I components and Q components for data symbols. As a result, the hard decision unit 15 can more accurately estimate amplitudes.

The hard decision unit 15 then performs a hard decision for data symbols based on the estimated amplitudes of data symbols. The hard decision unit 15 outputs hard decision results. For example, the hard decision unit 15 inputs the hard decision results to a demodulator, which demodulates data symbols, and a data determination unit, which performs error determination for data symbols. Note that when both positive and negative values of an average I component measured value, an average Q component measured value, and an average both components value are inputted from the signal point averaging unit 14, the hard decision unit 15 estimates the amplitudes of data symbols and performs a hard decision based on both positive and negative average values.

A case where the receiver 16 receives a signal modulated by the 16 QAM and the hard decision unit 15 receives 4800 data symbols $(I_1, Q_1)$ through $(I_{4800}, Q_{4800})$ from the RAKE combiner 13 and also receives the average I component absolute value and the average Q component absolute value calculated using the above-mentioned Expressions (1) and (2) from the signal point averaging unit 14 is described as an example.

The hard decision unit 15 estimates amplitudes of the data symbols, in order to estimate the correct signal point locations of data symbols, based on the average I component absolute value 1 and the average Q component absolute value 2 shown in FIG. 2. The hard decision unit 15 estimates correct signal point locations of the data symbols, as the positions indicated by white circles in the signal constellation diagram of FIG. 2. In other words, estimated signal point locations are the positions indicated by white circles in FIG. 2.

The hard decision unit 15 then performs a hard decision for 4800 data symbols $(I_1, Q_1)$ through $(I_{4800}, Q_{4800})$ inputted from the RAKE combiner 13. The hard decision unit 15 finds the closest signal point within the estimated signal points to the actual signal point corresponding to each of data symbols $(I_1, Q_1)$ through $(I_{4800}, Q_{4800})$. The hard decision unit 15 then determines that the found signal points, which have been estimated as being closest to actual signal points corresponding to the respective data symbols $(I_1, Q_1)$ through $(I_{4800}, Q_{4800})$, are original signal points for the respective data symbols $(I_1, Q_1)$ through $(I_{4800}, Q_{4800})$. The hard decision unit 15 performs a hard decision in this manner.

Note that when performing a hard decision, the hard decision unit 15 determines that signal points, which have been estimated as being closest to the actual signal points corresponding to the respective data symbols $(I_1, Q_1)$ through $(I_{4800}, Q_{4800})$, are original signal points of the respective data symbols $(I_1, Q_1)$ through $(I_{4800}, Q_{4800})$; moreover, the hard decision unit 15 may perform a hard decision by determining a distance between the actual signal point of each data symbol $(I_1, Q_1)$ through $(I_{4800}, Q_{4800})$ and corresponding closest signal point, which has been estimated as being closest to the actual signal point, or by calculating the square of the distance. In this case, the hard decision unit 15 outputs hard decision results such as the location of each signal point which has been determined as an original signal point, as well as each determined distance or the calculated square of the distance.

For example, the hard decision unit 15 inputs the hard decision results including the calculated distance or the calculated square of distance to a demodulator, such as a convolution demodulator or a turbo demodulator, and a data determination unit. The convolution demodulator or the turbo demodulator may use a distance between an actual signal point and a signal point, which has been estimated as being closest to the actual signal point or the square of the distance, for soft decision, for example.

(Communication Method)

Figure 3:
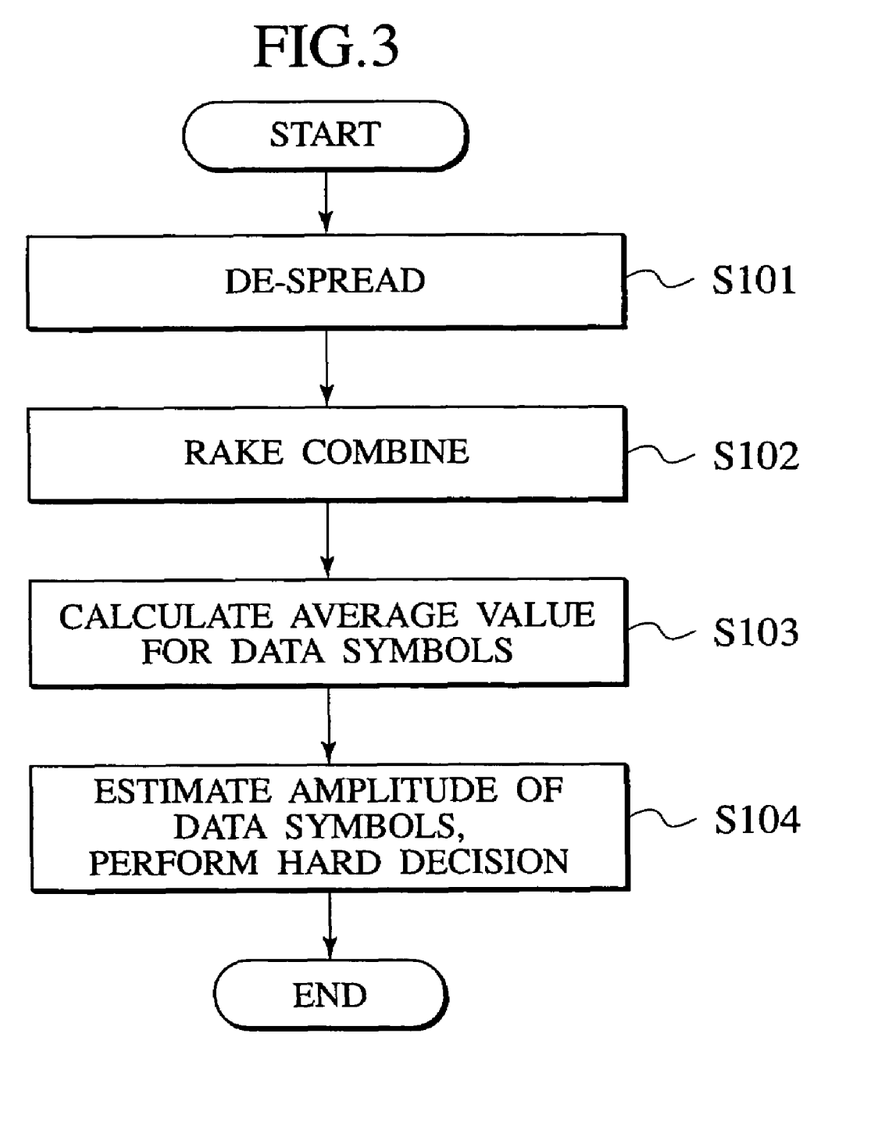
FIG. 3 is a flow diagram illustrating a procedure for a communication method according to the first embodiment of the present invention.

Next, a communication method using the reception device 10 is described below. As shown in FIG. 3, to begin with, the de-spreader 12 de-spreads a data chip received by the receiver 16 at each multipath reception time (S101). The RAKE combiner 13 then RAKE-combines the de-spread data symbols of each received multipath by maximum ratio-combining, based on the channel estimation results to generate data symbols (S102).

The signal point averaging unit 14 then calculates an average value for data symbols inputted from the RAKE combiner 13. The signal point averaging unit 14 calculates as average values for data symbols, the average value concerning I components and Q components for data symbols, or an average reception power values for data symbols (S103). The hard decision unit 15 then estimates amplitudes of data symbols, based on the average values calculated by the signal point averaging unit 14. The hard decision unit 15 then performs a hard decision for data symbols, based on the estimated amplitudes of data symbols (S104).

According to the reception device 10, demodulator 11, and communication method, the signal point averaging unit 14 calculates an average value for data symbols, such as average values concerning I components and Q components for data symbols received by the receiver 16, or an average value of reception power values for data symbols. The hard decision unit 15 then estimates amplitudes of data symbols, based on those average values. In addition, the hard decision unit 15 performs a hard decision for data symbols, based on the estimated amplitudes of data symbols. The average value for data symbols is equivalent to amplitude of the data symbols.

As a result, the reception device 10 and the demodulator 11 can directly and easily estimate amplitudes using received symbols. Accordingly, the reception device 10 and the demodulator 11 can easily estimate amplitudes without using a complex method, such as receiving notification of transmission power ratios to estimate amplitudes using the transmission power ratios, or estimating transmission power ratios and then estimating amplitudes using the estimated ratios. As a result, the reception device 10 and the demodulator 11 can reduce a control load and a control delay. Furthermore, the reception device 10 and the demodulator 11 can perform a hard decision by simply estimation of amplitudes of data symbols.

As a result, the reception device 10 and the demodulator 11 can easily demodulate a signal, which has been performed by multi-level quadrature amplitude modulation such as 16 QAM or 64 QAM. Therefore, for example, even in mobile communication, which sharp amplitude variation may occur, simpler communication using multi-level quadrature amplitude modulation can be provided.

Second Embodiment (Reception Device)

Figure 4:
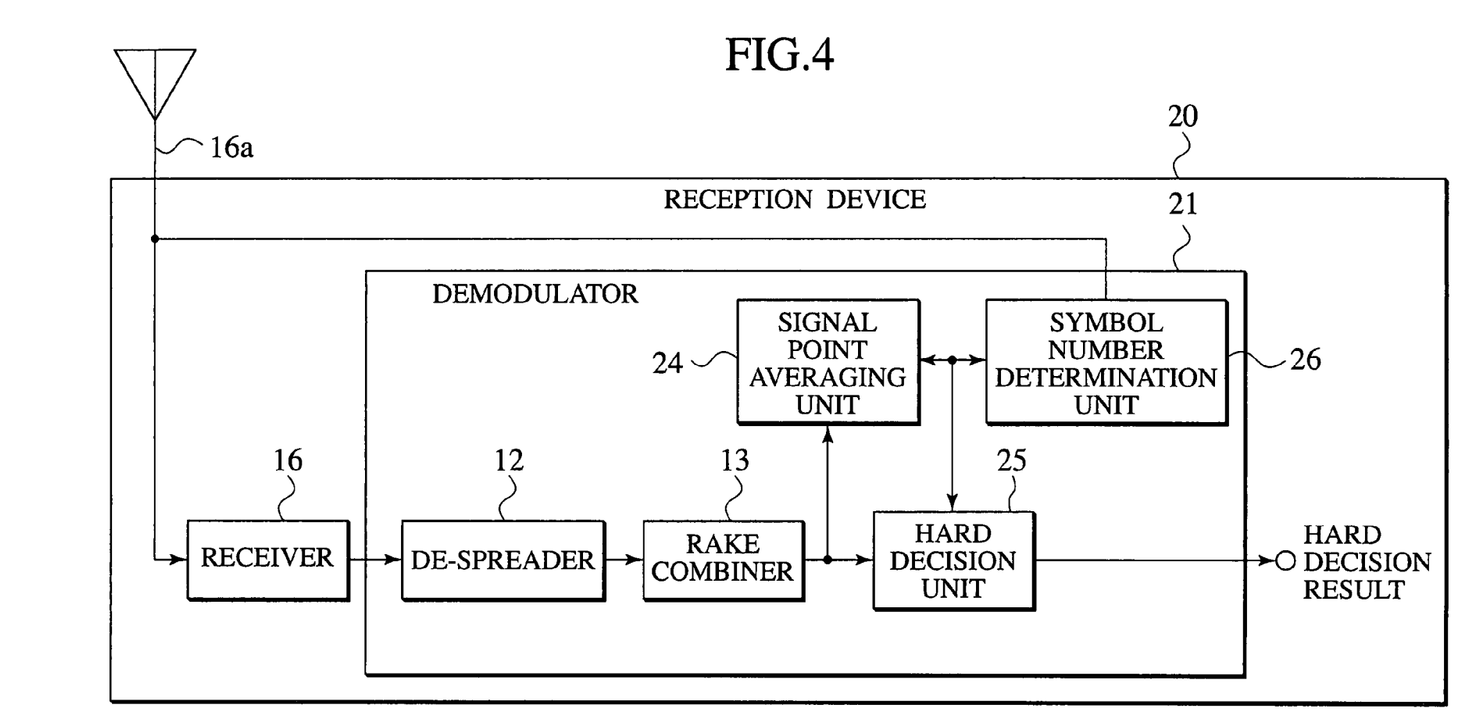
FIG. 4 is a block diagram illustrating a configuration of a reception device according to a second embodiment of the present invention.

As shown in FIG. 4, a reception device 20 comprises a demodulator 21, a receiver 16, and an antenna 16a. The demodulator 21 comprises a de-spreader 12, a RAKE combiner 13, a signal point averaging unit 24, a hard decision unit 25, and a symbol number determination unit 26. Note that FIG. 4 shows a section included in the demodulator 21, which operates processes from inputting a signal received by the receiver 16 to performing a hard decision. In FIG. 4, the receiver 16, the antenna 16a, the de-spreader 12, and the RAKE combiner 13 are substantially the same as the receiver 16, the antenna 16a, the de-spreader 12, and the RAKE combiner 13 shown in FIG. 1, respectively; therefore, by attaching the same reference numerals for them, duplicate description is omitted.

The symbol number determination unit 26 determines the number of data symbols to estimate amplitudes. A data symbol series including a plurality of data symbols is divided into blocks, each including a number of data symbols to which estimation of amplitude is to be performed. The amplitude estimation is then performed for each block of data symbols. As a result, the symbol number determination unit 26 determines the number of data symbols included in one block for estimating the amplitude at once. Hereafter, the number of the plurality of data symbols to estimate the amplitude is referred to as 'estimation symbol number'. The symbol number determination unit 26 notifies the signal point averaging unit 24 and the hard decision unit 25 of the determined estimation symbol number.

Alternatively, the symbol number determination unit 26 may determine the number of a plurality of data symbols to which hard decision is to be performed (hereafter, referred to as 'hard decision symbol number'), separately from the estimation symbol number. In this case, the symbol number determination unit 26 notifies the hard determination unit 25 of both the determined estimation symbol number and the determined hard decision symbol number.

More specifically, the symbol number determination unit 26 may retain predefined fixed values, and select and determine the estimation symbol number and the hard decision symbol number therefrom. The fixed estimation symbol number and the fixed hard decision symbol number may be specified by a specific data symbol number, a slot number, a frame number, or transmission timing intervals (TTIs). In other words, the estimation symbol number and the hard decision symbol number may be specified by a slot number or a frame number without specifying a data symbol number. In this case, the signal point averaging unit 24 and the hard decision unit 25 calculate average values, estimate amplitudes, and perform a hard decision for each slot of, each frame of, or each TTI of data symbols.

Figure 5A:
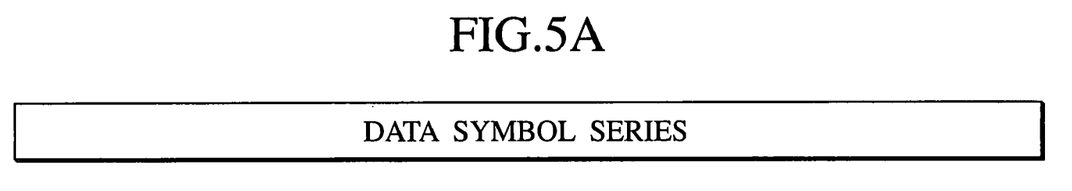
FIGS. 5A through 5C are diagrams illustrating a method for determining an estimated symbol number according to the second embodiment of the present invention.
Figure 5B:
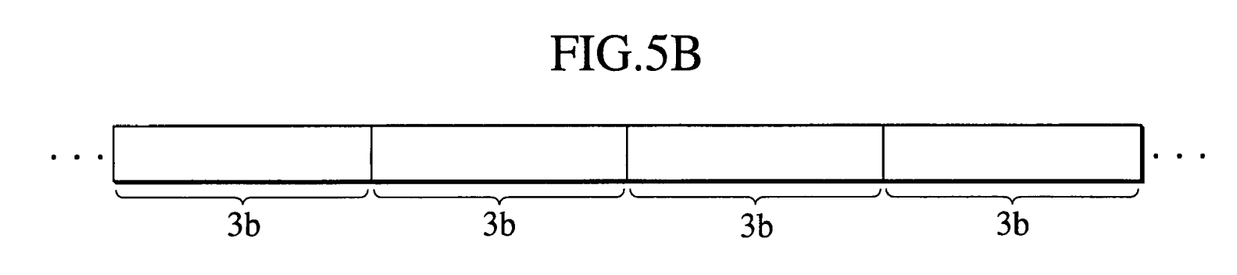

Moreover, the symbol number determination unit 26 may also determine the estimation symbol number and the hard decision symbol number based on the fading frequency that indicates the condition of the propagation environment. The symbol number determination unit 26 connects to the antenna 16a to acquire the frequency of fading that adversely affects a communication channel between the antenna 16a and a transmission device. When the acquired fading frequency is high, the symbol number determination unit 26 decreases the estimation symbol number and the hard decision symbol number. As a result, when there is a data symbol series including a plurality of data symbols, such as shown in FIG. 5A, the estimation symbol number and the hard decision symbol number included in a single block 3b decrease as shown in FIG. 5B. As a result, when the fading frequency is high, and the amplitude variation of the data symbols is sharp, the hard decision unit 25 can estimate amplitudes and perform a hard decision by dividing the data symbols into small blocks so as to find change in amplitudes of data symbols.

Figure 5C:
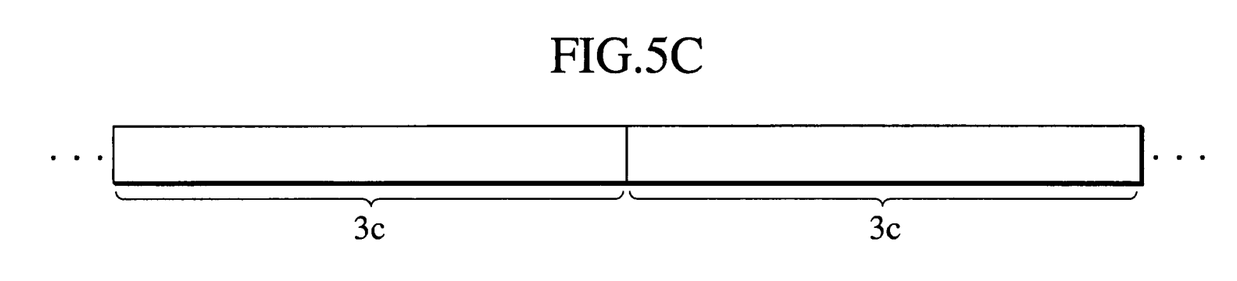

Meanwhile, when the acquired fading frequency is low, symbol number determination unit 26 increases the estimation symbol number and the hard decision symbol number. As a result, as shown in FIG. 5C, for example, the estimation symbol number and the hard decision symbol number included in a single block 3c increase. When the fading frequency is low, and the amplitude variation of the data symbols is small, the hard decision unit 25 can estimate amplitudes and perform a hard decision using a large number of data symbols, and decrease noise components. Therefore, the hard decision unit 25 can perform more accurate amplitude estimation, and also perform a hard decision based on the accurate estimated amplitudes.

In addition, the symbol number determination unit 26 may determine the estimation symbol number and the hard decision symbol number based on change in average values. The symbol number determination unit 26 receives notification of calculated average values from the signal point averaging unit 24. The symbol number determination unit 26 sequentially determines the estimation symbol number and the hard decision symbol number, based on change in the notified average values. To begin with, the symbol number determination unit 26 calculates a difference between the average values. The symbol number determination unit 26 calculates, for example, a difference between the average values for neighboring blocks or a difference between the average values for blocks separated at certain intervals. The symbol number determination unit 26 predetermines and retains a threshold value for a difference between the average values for determining the estimation symbol number and a threshold value for a difference between average values for determining the hard decision symbol number. The symbol number determination unit 26 then compares the calculated difference between the average values with the threshold value.

When the difference between the average values is more than the threshold value, the symbol number determination unit 26 determines that amplitude variation of the data symbols is sharp and decreases the estimation symbol number and the hard decision symbol number. As a result, the estimation symbol number and the hard decision symbol number included in a single block decrease. Therefore, when amplitude variation of the data symbols is sharp, the hard decision unit 25 can estimate amplitudes and perform a hard decision by dividing the data symbols into small blocks so as to find change in amplitudes of data symbols.

On the other hand, when the difference between the average values is smaller than the threshold value, the symbol number determination unit 26 determines that amplitude variation of the data symbols is small, and then increases the estimation symbol number and the hard decision symbol number. As a result, the estimation symbol number and the hard decision symbol number included in a single block increase. Therefore, when amplitude variation of the data symbols is small, the hard decision unit 25 can estimate amplitudes and perform a hard decision using a large number of data symbols, and decrease noise components. Accordingly, the hard decision unit 25 can perform more accurate amplitude estimation, and perform a hard decision based on the accurate estimated amplitudes.

For example, when the estimation symbol number is 1200, and calculation of average values, amplitude estimation, and a hard decision are performed every 1200 data symbols, 1200 data symbols configure one block. The symbol number determination unit 26 calculates a difference between the average value of two blocks before and average value of one block before, when determining the estimation symbol number for the next estimating amplitudes. The symbol number determination unit 26 then compares the calculated difference between the average values with the threshold value. When the difference between the average values is more than the threshold value, the symbol number determination unit 26 then decreases the estimation symbol number to less than 1200. Meanwhile, when the difference between the average values is smaller than the threshold value, the symbol number determination unit 26 then increases the estimation symbol number to more than 1200.

Alternatively, the symbol number determination unit 26 may define a range of the differences between the average values, and if the calculated difference between the average values is within the range, the symbol number determination unit 26 may not change the estimation symbol number and the hard decision symbol number to keep them as fixed values. If the calculated difference between the average values is more than the upper limit of the range, the symbol number determination unit 26 may decrease the estimation symbol number and the hard decision symbol number. Otherwise, if the calculated difference between the average values is less than the lower limit of the range, the symbol number determination unit 26 may increase the estimation symbol number and the hard decision symbol number. Note that a threshold value of the difference between the average values for determining the estimation symbol number, a threshold of the difference between the average values for determining the hard decision symbol number, and a range of differences between the average values may be specified as required. For example, the threshold value and the range of differences between the average values may be specified considering the findings of change in amplitudes and accuracy of an amplitude estimation.

The signal point averaging unit 24 calculates an average value for the data symbols every number of the data symbols determined by the symbol number determination unit 26, that is, every estimation symbol number. The signal point averaging unit 24 partitions a data symbol series including a plurality of data symbols inputted from the RAKE combiner 13 into a plurality of blocks every estimation symbol number notified from the symbol number determination unit 26. The signal point averaging unit 24 then calculates an average value for each block of data symbols. The signal point averaging unit 24 inputs the average values calculated for data symbols of the estimation symbol number to the hard decision unit 25. In addition, when the symbol number determination unit 26 determines the estimation symbol number and the hard decision symbol number, based on change in the average values, the signal point determination unit 24 notifies the symbol number determination unit 26 of the calculated average values.

Note that average values for data symbols include an average value for a part of data symbols selected from the received data symbols, and an average value for received data symbols except for the data symbols having large differences from other data symbols, as well as an average value for all data symbols received by the receiver 16.

Accordingly, even when calculating an average value for data symbols of the estimation symbol number, the signal point averaging unit 24 need not calculate an average value using all data symbols included in the blocks partitioned every estimation symbol number. The signal point averaging unit 24 may select a predetermined proportion of data symbols from data symbols included in each block partitioned every estimation symbol number, and calculate an average value using the selected data symbols. Alternatively, the signal point averaging unit 24 may calculate an average value using data symbols included in each block except for data symbols having differences from other data symbols being more than or equal to a predetermined value.

The hard decision unit 25 estimates amplitudes of data symbols every number of the data symbols determined by the symbol number determination unit 26, that is, every estimation symbol number. The hard decision unit 25 partitions a data symbol series including a plurality of data symbols inputted from the RAKE combiner 13 into a plurality of blocks every estimation symbol number notified from the symbol number determination unit 26. The hard decision unit 25 then estimates amplitudes of data symbols including each block, based on the average value for data symbols of the estimation symbol number inputted from the signal point averaging unit 24.

The hard decision unit 25 performs a hard decision for the data symbols every number of the data symbols determined by the symbol number determination unit 26. When only the estimation symbol number is notified from the symbol number determination unit 26, the hard decision unit 25 performs a hard decision for data symbols including each block, which has been partitioned when estimating amplitudes, based on the estimated amplitudes of data symbols.

Meanwhile, in the case where the hard decision symbol number is also notified from the symbol number determination unit 26, the hard decision unit 25 partitions a data symbol series inputted from the RAKE combiner 13 into a plurality of blocks every hard decision symbol number, when performing a hard decision. The hard decision unit 25 then performs a hard decision for data symbols included in each block, which has been divided every hard decision symbol number.

For example, it is assumed that the symbol number determination unit 26 determines 2400 as the estimation symbol number. The signal point averaging unit 24 partitions a data symbol series inputted from the RAKE combiner 13 into a plurality of blocks every 2400 data symbols. The signal point averaging unit 24 then calculates average values for 2400 data symbols included in each block. The hard decision unit 25 partitions a data symbol series inputted from the RAKE combiner 13 into a plurality blocks every 2400 data symbols. The hard decision unit 25 then estimates amplitudes of 2400 data symbols included in each block, based on the average values for 2400 data symbols inputted from the signal point averaging unit 24.

Finally, the hard decision unit 25 performs a hard decision for 2400 data symbols included in each block, based on the estimated amplitudes of data symbols. The signal point averaging unit 24 and the hard decision unit 25 shown in FIG. 3 are substantially the same as the signal point averaging unit 14 and the hard decision unit 15 shown in FIG. 1, respectively, except for the above-mentioned points.

(Communication Method)

Figure 6:
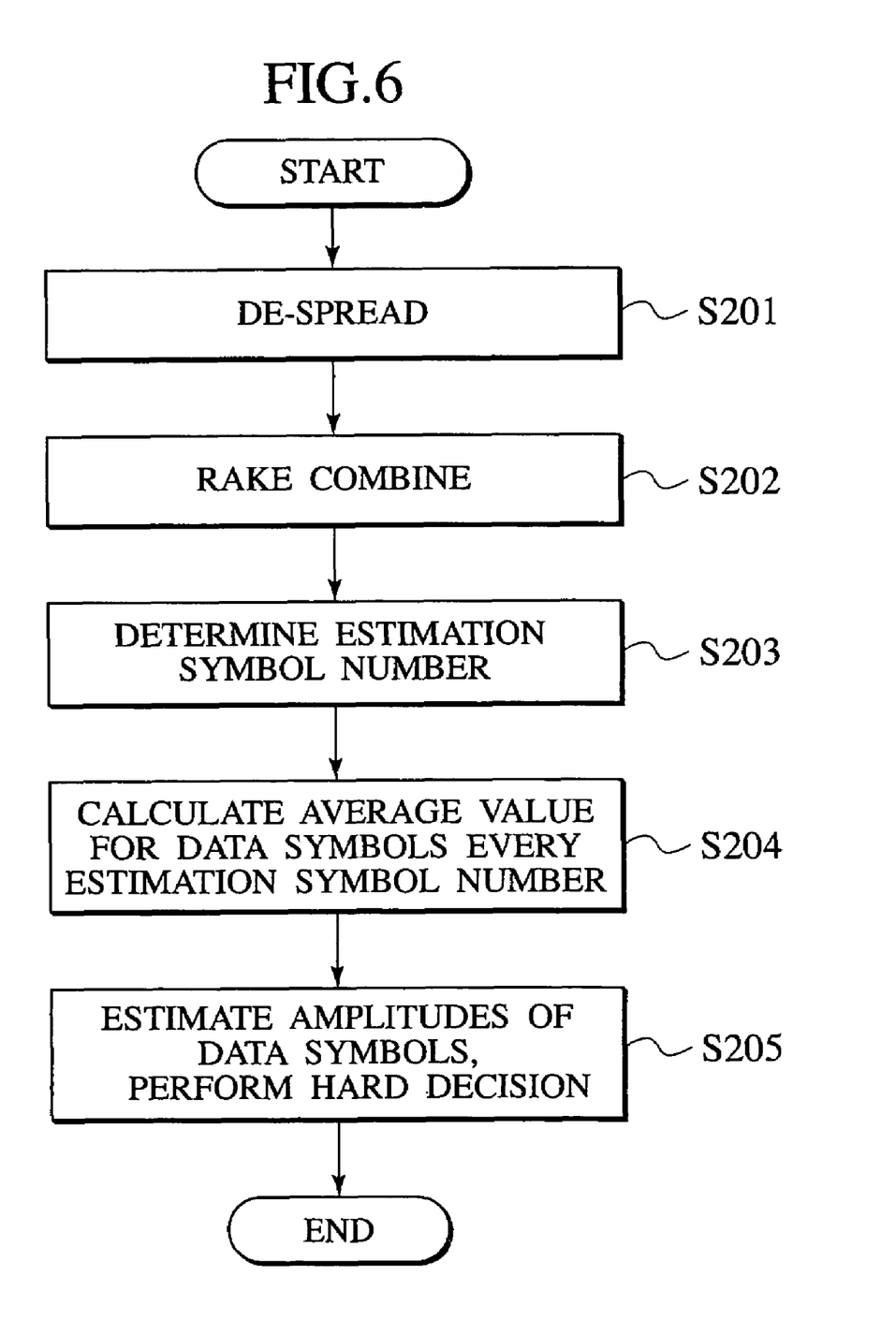
FIG. 6 is a flow diagram illustrating a procedure for a communication method according to the second embodiment of the present invention.

Next, a communication method using the reception device 20 is described below. As shown in FIG. 6, to begin with, steps (S201) and (S202) are performed. The steps (S201) and (S202) are substantially the same as the steps (S101) and (S102), respectively, shown in FIG. 3.

Next, the symbol number determination unit 26 determines the estimation symbol number based on, for example, the fading frequency (S203). The signal point averaging unit 24 calculates an average value for data symbols inputted from the RAKE combiner 13, every estimation symbol number determined by the symbol number determination unit 26 (S204). Next, the hard decision unit 25 estimates amplitudes of data symbols every estimation symbol number determined by the symbol number determination unit 26. Finally, the hard decision unit 25 performs a hard decision for data symbols every estimation symbol number determined by the symbol number determination unit 26 (S205).

According to the reception device 20, the demodulator 21, and the communication method, the following effects can be obtained in addition to those obtained by the reception device 10 and the demodulator 11 shown in FIG. 1 and the communication method shown in FIG. 3.

The symbol number determination unit 26 determines the estimation symbol number. The signal point averaging unit 24 and the hard decision unit 25 then calculate an average value, estimate amplitudes, and perform a hard decision, every determined estimation symbol number. Therefore, the reception device 20 and the demodulator 21 may change the estimation symbol number. As a result, when the fading frequency is high, and the amplitude variation of data symbols is sharp, for example, the reception device 20 and the demodulator 21 can decrease the estimation symbol number so as to find change in the amplitudes of the data symbols, and then perform a hard decision according to the found change. Meanwhile, when the fading frequency is low, and the amplitude variation of data symbols is small, the reception device 20 and the demodulator 21 can decrease the noise components by increasing the estimation symbol number. Accordingly, the reception device 20 and the demodulator 21 can perform more accurate amplitude estimation, and perform a hard decision based on such estimated amplitudes.

In addition, the symbol number determination unit 26 may determine the estimation symbol number and the hard decision symbol number, based on the fading frequency or change in average values. In this manner, the reception device 20 and the demodulator 21 can change the estimation symbol number and the hard decision symbol number according to the propagation environment, by determining the estimation symbol number and the hard decision symbol number based on the fading frequency and change in average values.

MODIFIED EXAMPLE

Note that the present invention is not limited to the above embodiments, and various modifications thereof are possible. For example, the demodulators 11 and 21 use the de-spreader 12 and the RAKE combiner 13 so as to generate data symbols; however, data symbols may be generated using a de-spreader and an equalizer, or using a joint detection (JD), which is a type of equalizer.

Moreover, the present invention is not limited to the radio access scheme, and can be applied to the wideband code division multiple access (W-CDMA), the time division multiple access (TDMA), the frequency division multiple access (FDMA), and TTD-CDMA system. In addition, the present invention can be applied to an interference canceller.

What is claimed is:

1. A reception device comprising:
   an averaging unit configured to calculate at least one average value concerning in-phase components and quadrature phase components for a plurality of received data symbols;
   an amplitude estimator configured to estimate locations of signal points defined by a predetermined quadrature amplitude modulation, based on the at least one average value calculated by the averaging unit;
   a hard decision unit configured to determine, within the signal points, a closest signal point to an actual signal point of each of the received plurality of data symbols; and
   a symbol number determination unit configured to determine a number of the plurality of received data symbols based on both a fading frequency and a change in the average value,
   wherein the averaging unit is configured to calculate the at least one average value, every number of the plurality of received data symbols determined by the symbol number determination unit, and
   the amplitude estimator is configured to estimate the locations of the signal points, every number of the plurality of received data symbols determined by the symbol number determination unit.

2. The reception device of claim 1, wherein the averaging unit is configured to calculate, as the at least one average value concerning in-phase components and quadrature phase components, at least one of:
   a combination of an average in-phase component absolute value and an average quadrature phase component absolute value;
   a combination of a positive average in-phase component measured value, a negative average in-phase component measured value, a positive average quadrature phase component measured value, and a negative average quadrature phase component measured value;

an average absolute value of both the in-phase component and the quadrature phase component; or a combination of a positive average of the in-phase component measured value and the quadrature phase component measured value and a negative average of the in-phase component measured value and the quadrature phase component measured value.

3. The reception device of claim 1, wherein the hard decision unit is configured to perform a hard decision for the plurality of received data symbols, based on the signal points estimated by the amplitude estimator.

4. A demodulator comprising:

an averaging unit configured to calculate at least one average value concerning in-phase components and quadrature phase components for a plurality of received data symbols;

an amplitude estimator configured to estimate locations of signal points defined by a predetermined quadrature amplitude modulation based on the at least one average value calculated by the averaging unit;

a hard decision unit configured to determine, within the signal points, a closest signal point to an actual signal point of each of the received plurality of data symbols; and a symbol number determination unit configured to determine a number of the plurality of received data symbols based on both a fading frequency and a change in the average value, wherein the averaging unit is configured to calculate the at least one average value, every number of the plurality of received data symbols determined by the symbol number determination unit, and the amplitude estimator is configured to estimate the locations of the signal points, every number of the plurality of received data symbols determined by the symbol number determination unit.

5. A communication method comprising:

calculating, with a processor, at least one average value concerning in-phase components and quadrature phase components of a plurality of received data symbols;

estimating, with an amplitude estimator, locations of signal points defined by a predetermined quadrature amplitude modulation based on the at least one average values calculated in the calculating step;

determining, within the signal points with a hard decision unit, a closest signal point to an actual signal point of each of the received plurality of data symbols; and determining, with a symbol number determination unit, a number of the plurality of received data symbols based on both a fading frequency and a change in the average value, wherein the calculating includes calculating the at least one average value, every number of the plurality of received data symbols determined by the symbol number determination unit, and the estimating includes estimating the locations of the signal points, every number of the plurality of received data symbols determined by the symbol number determination unit.

6. The reception device of claim 1, wherein, when a second fading frequency is higher than a first fading frequency, the symbol number determination unit is configured to decrease the number of the plurality of received data symbols smaller than the number of plurality of received data symbols corresponding to the first fading frequency.

7. The reception device of claim 1, wherein the averaging unit is configured to select a plurality of received data symbols except for data symbols with differences from other data symbols being more than or equal to a predetermined value, and the at least one average value is an average of the selected received data symbols.

* * * * *